United States Patent [19]

Jackson et al.

[11] 4,408,571
[45] Oct. 11, 1983

[54] METHANE COLD STARTER IN ALCOHOL FUEL TREATMENT AND DISTRIBUTION METHOD

[75] Inventors: Robert G. Jackson, Weston, Conn.; Heeyoung Yoon, McMurray, Pa.

[73] Assignee: Conoco Inc., Wilmington, Del.

[21] Appl. No.: 388,839

[22] Filed: Jun. 16, 1982

Related U.S. Application Data

[63] Continuation-in-part of Ser. No. 286,992, Jul. 27, 1981, Pat. No. 4,366,782.

[51] Int. Cl.³ .................. F02B 43/00; F02M 27/02
[52] U.S. Cl. ........................... 123/3; 123/180 AC; 123/576
[58] Field of Search ............ 123/1 A, 3, 1 EC, 1 R, 123/1 AC, 576, 557; 48/197 R

[56] References Cited

U.S. PATENT DOCUMENTS

| | | | |
|---|---|---|---|
| 3,828,736 | 8/1974 | Koch | 123/1 A |
| 4,021,370 | 5/1977 | Harris et al. | 48/197 R |
| 4,028,067 | 6/1977 | Gent | 48/197 R |
| 4,046,522 | 9/1977 | Chen et al. | 123/3 |
| 4,086,877 | 5/1978 | Henkel et al. | 123/3 |
| 4,088,450 | 5/1978 | Kosaka et al. | 123/3 |
| 4,091,086 | 5/1978 | Hindin et al. | 423/648 R |
| 4,282,835 | 8/1981 | Peterson et al. | 123/1 A |

OTHER PUBLICATIONS

Kikuchi et al., J. Japan Petrol. Inst., 23,(5), 328–333 (1980).

Primary Examiner—William A. Cuchlinski, Jr.
Attorney, Agent, or Firm—Dale Lovercheck; William A. Mikesell, Jr.

[57] ABSTRACT

Cold start-up of a engine fueled by alcohol or hydrogen dissociated from alcohol by vaporizing alcohol in a first vaporizer contacting that vapor with methanation catalyst in a methanation reactor to form methane, passing methane and alcohol delivered through a by-pass conduit to the engine, starting the engine, vaporizing alcohol in a second vaporizer to form additional alcohol vapor, contacting the additional alcohol vapor and a dissociation catalyst in a dissociation reactor to form hydrogen and carbon monoxide, conveying the hydrogen and carbon monoxide to the engine.

8 Claims, 1 Drawing Figure

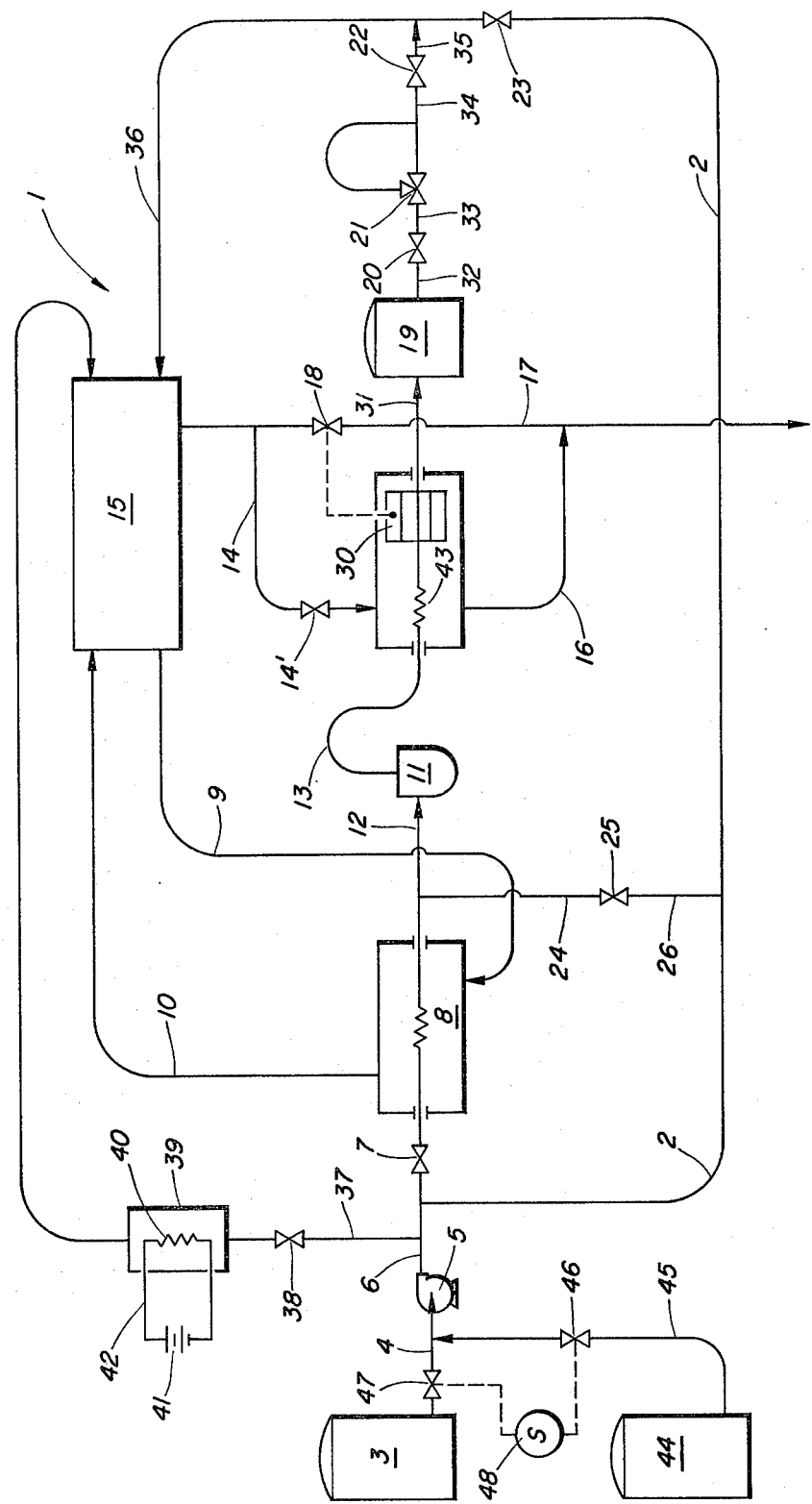

4,408,571

METHANE COLD STARTER IN ALCOHOL FUEL TREATMENT AND DISTRIBUTION METHOD

BACKGROUND OF THE INVENTION

This is a continuation-in-part of U.S. patent application Ser. No. 286,992, filed July 27, 1981, now U.S. Pat. No. 4,366,782, issued Jan. 4, 1983.

Kosaka et al., disclosed in U.S. Pat. No. 4,088,450 a plurality of catalysts arranged in a desirable order based on the temperature gradient existing in the reaction chamber. The operating temperature of the catalyst and the temperature of the portion of the reaction chamber it is in, are matched so as to avoid catalytic degradation and/or catalytic inactivity.

Hindin et al. in U.S. Pat. No. 4,091,086 discloses a catalytic composition particularly useful in the production of hydrogen from methanol, especially by steam reforming, which comprises a mixture of zinc oxide, copper oxide, thorium oxide and aluminum oxide whereby the activity and activity maintenance of the catalytic composition is superior relative to a composition otherwise substantially the same but lacking thoria.

Henkel et al. in U.S. Pat. No. 4,086,877 discloses a fuel gas obtained in a reformed gas generator through the catalytic reaction of hydrocarbons and a gas containing oxygen and provided to an internal combustion engine has its heat content along with that of the exhaust gas of the engine used to convert methanol endothermically into a gas mixture containing carbon monoxide and hydrogen with the gas mixture so formed fed to one or both the reformed gas generator and, along with the fuel gas, the internal combustion engine.

Peterson et al. in U.S. Pat. No. 4,282,835 provides for synthesizing CO and $H_2$ fuel from CO and water in a second synthesizer. The methanol is confined in a fuel tank as a liquid. The water is confined in a water tank. A fuel pump and a water pump pump fuel and water to a mixing valve. A heat exchanger heats the fuel and water to a gas which passed through Ni or $Al_2O_3$ above 500° C. where the $CH_3OH$ disassociates to CO and $H_2$. The gas passes to a second synthesizer containing Fe or $Al_2O_3$ above 500° C. where $H_2O$ and CO form $H_2$ and $CO_2$ the gas is mixed with air and passed to an engine.

Chen et al. in U.S. Pat. No. 4,056,552 provides a preengine converter. The catalyst in the first reactor may be copper zinc chromite. Col. 2, lines 28-35. A second catalyst is a hydrocarbon cracking catalyst such as zeolite.

Kikuchi et al. in J. Japan Petrol. Inst., 23, (5), 328-333 (1980) discloses exothermic partial combustion during start-up of a methanol fueled engine. At Table I on page 329 he lists copper oxide zinc oxide catalyst as well as copper nickel catalyst for conversion of methanol on various supported copper catalysts. At page 332 Kikuchi discusses methanol conversion to give a formaldehyde type intermediate which decomposes to hydrogen and carbon monoxide as shown in the first two equations listed therein.

SUMMARY OF THE INVENTION

A method of cold start-up for an engine fueled by alcohol or hydrogen dissociated from alcohol comprising the sequence of steps as follows:

providing a first vaporizer means, a second vaporizer means, a methanation catalyst within a first reactor means, and a dissociation catalyst within a second reactor means, vaporizing alcohol in said first vaporizer means to form a first alcohol vapor, contacting said first alcohol vapor and said methanation catalyst to form methane, passing said methane and alcohol to said engine, starting said engine, vaporizing alcohol in said second vaporizer means to form second alcohol vapor, contacting said second alcohol vapor and said dissociation catalyst in said second catalytic reactor to form hydrogen and carbon monoxide, conveying said hydrogen and carbon monoxide to said engine.

BRIEF DISCUSSION OF THE DRAWING

The drawing is a schematic representation of a method in accordance with the present invention.

DETAILED DISCUSSION OF THE INVENTION

The invention relates to a fuel treatment and distribution apparatus and method as shown in the drawing.

Particularly the invention relates to starting and more specifically cold start-up of an engine which uses alcohol and/or hydrogen dissociated from alcohol as its fuel. Alcohol fuels particular preference are methanol and ethanol. However, at temperatures at and below 0° C. the vapor pressure of such alcohols is sufficiently low to cause difficulties during start-up. The present invention provides a method of circumventing this difficulty by forming a small amount of methane for the purpose of cold starting the engine. Methane is a gas even at cold temperatures where the methanol vapor pressure is inadequate.

A methanation catalyst is fed alcohol which is converted into methane which is then fed along with atomized liquid alcohol to the engine the engine is then started. After start-up the engine is fed vaporized alcohol or hydrogen and carbon monoxide mixture formed from alcohol by dissociation over a dissociation catalyst for example. The methanation catalyst is heated to a temperature sufficient for the methanation reaction to occur preferably within the range of 300° to 500° C. For this purpose a barium titanate heater which requires no temperature switch is preferred to be used. Current passes from the battery through the barium titanate heater which maintains the necessary methanation temperature in the catalytic bed. After start-up the battery is disconnected from the barium titanate heater and the valve leading to the start-up methanation catalytic reactor is closed. The engine is then run off of vaporized alcohol or hydrogen dissociated from alcohol.

As shown in the drawing, a fuel system is generally shown at 1. The fuel system 1 has a catalyst containing reactor 30 and a by-pass conduit 2. Liquid alcohol is stored in the liquid alcohol storage tank 3. From liquid alcohol storage tank 3 the liquid alcohol is conveyed in liquid alcohol conduit 4 by pump 5 to vaporizer feed line 6 and by-pass conduit 2. Liquid alcohol passes from vaporizer feedline 6 through solenoid valve 7 and into the vaporizer 8. The vaporizer 8 is heated by engine coolant which enters vaporizer 8 through vaporizer heat transfer feedline 9. From the vaporizer the engine coolant returns to the engine through vaporizer heat transfer fluid output line 10. The vaporized alcohol is conveyed from the vaporizer 8 to the liquid trap 11 by line 12 and from the liquid trap 11 through line 13 to the catalyst containing reactor 30. The catalyst containing reactor 30 operates at about 600° F. The vaporized alcohol is dissociated into hydrogen and carbon monoxide in the catalyst containing reactor 30. A preferred catalyst for dissociation in the catalyst bed of the catalyst containing reactor 30 is a copper/zinc catalyst with or without promoters such as chromium. However, the dissociater may be provided with a dual catalyst bed; one catalyst being a low temperature dissociation catalyst and the other catalyst being a high temperature dissociation catalyst. Useful as a low temperature catalyst is a copper/zinc catalyst with or without promoters. Useful as a high temperature catalyst is a zinc/chromium catalyst. The advantage of having a dual catalyst bed is that the low temperature catalyst is protected from deactivation by thermal sintering because the dissociation reaction in the high temperature catalyst zone reduces the operating temperature of the low temperature catalyst bed. Thus, the vaporized alcohol first contacts the high temperature catalyst and then contacts the low temperature catalyst as it passes through the catalyst containing reactor 30.

The dissociation catalyst bed may be low temperature catalyst alone for example a copper/zinc catalyst as previously mentioned.

The catalyst containing reactor 30 and the superheater shown in the drawing are heated by exhaust from the internal combustion engine 15. Exhaust from the internal combustion engine 15 is conveyed by conduit 14 having solenoid valve 14' to the catalyst containing reactor 30. The engine exhaust leaves the catalyst containing reactor 30 through the conduit 16. This cooled engine exhaust may be recycled to the engine or exhausted to the atmosphere or partially recycled and partly exhausted to the atmosphere. The superheater 43 after line 13 and before reactor 30 heats the fuel which is heated to about 200° F. in a vaporizer 8 and superheated to about 600° F. in the superheater 43.

An exhaust flow valve 18 is provided with temperature control, to control the temperature of the catalyst containing reactor 30. Engine exhaust from the engine 15 may be by-passed around the catalyst containing reactor 30 through the exhaust flow valve 18 and into the exhaust flow conduit 17. By controlling the amount of exhaust used to heat the catalyst containing reactor 30 the temperature of the catalyst containing reactor may be regulated. The exhaust flow valve 18 is connected to a temperature sensor on the reactor 30.

Dissociated alcohol from the catalyst containing reactor 30 passes through conduit 31 into storage tank 19. Storage tank 19 provides gas for use during startup and surge conditions such as acceleration. From the storage tank 19 gas travels through conduit 32 to the solenoid valve 20. From the solenoid valve 20 gas travels through line 33 to the pressure control valve 21. From the pressure control valve 21 the dissociated alcohol travels through line 34 to the dissociated gas control mechanism 22. From the dissociated gas control mechanism 22, the gas travels through line 35 to fuel feed conduit 36 into engine 15. The dissociated gas control mechanism 22 and the fuel flow mechanism 23 may be that of an automobile engine fuel injection system or an automobile engine carburetor.

Undissociated liquid alcohol from by-pass conduit 2 also passes into fuel feed conduit 36. By-pass conduit 2 is provided with fuel flow mechanism 23. Fuel flow mechanism 23 controls the amount of liquid alcohol to be fed into the internal combustion engine 15 via fuel feed conduit 36. The liquid alcohol is preferably atomized in a carburetor just prior to entering the cylinders of the engine.

The preferred alcohol for use in the fuel system is methanol. Among the advantages of the by-pass system is that more fuel material may be passed into the internal combustion engine 15 during periods of peak operation, such as in the case where quantities of fuel in excess of those of normal operation are needed for example during startup and acceleration.

The line 24 connects evaporator 8 to valve 25. Line 26 connects valve 25 to line 2. Thus, evaporated methanol may be fed to line 2 to provide a mixed feed of vaporized methanol and liquid methanol to engine 15 via line 36.

Because of the capacity of the acceleration loop, the dissociation reactor need only be large enough to handle normal operation conditions. Periods of peak operation can be handled by the capacity of the acceleration loop.

The reactor 39 is required to convert only a small portion of the alcohol feed required for cold starting the engines. Liquid alcohol delivered through line 2 is combined with gaseous fuel from reactor 39 for engine cold start. Preferably the liquid alcohol is atomized. Since only a small portion of the alcohol feed is converted, the reactor 39 may be physically smaller and contain less catalyst then would be needed to convert all of the start-up fuel to methane.

During start-up the valves 7, 14' and 20 are in a closed position so that the liquid fuel from tank 3 is fed through line 37 through valve 38 into combined vaporizer catalytic reactor 39 which has electrical resistance heating element 40 in the catalyst bed of catalytic reactor 39. The methanation catalyst preferable is $Ni/Al_2O_3$ (Ni supported by $Al_2O_3$) or $Ni/SiO_2$. The battery 41 passes current through line 42 and electrical resistance heating element 40. The methanation catalyst such as $Ni/Al_2O_3$ in the reactor 39 forms a methanol feed into methane which are fed to the engine for start-up by the reaction $$2CH_3OH \rightarrow CH_4 + 2H_2 + CO_2 \tag{I}$$

The methanation reaction is exothermic which helps heat the catalytic bed.

In another embodiment of the invention, the tank 3 may contain gasoline or alternatively, the tank 3 may contain an alcohol fuel and an additional tank 44 containing an alternative fuel such as gasoline, this additional tank 44 is in fluid flow communication with line 2 for example by being connected to line 4. When operating on gasoline the valves 7, 14' and 20 are closed and the gasoline is be fed through the line 2 through the fuel flow mechanism 23 to the engine 15.

In start-up using methanol, for example, as the alcohol fuel, the valves 7, 14' and 20 are closed so that methanol is fed through the line 37 directly through valve 38 and then into the engine. In start-up, liquid alcohol is also fed to the engine via line 2. When the engine is turned off the valves 7, 14', 20 and 38 are closed. In closing these valves dissociated gas is trapped in the storage tank 19. This stored hydrogen optionally is forced from tank 19 through open valve 20 into engine 15 to supplement the methane formed in reactor 39 during start-up.

In an embodiment of the invention using more than one fuel tank, a selector switch 48 which provides for the selection of which fuel is to be used is provided by control of the feed valves from the storage tank for each fuel. In this embodiment of the invention, a valve wold be placed in line 4 between the pump 5 and the storage tank 3. Additionally, the additional storage tank 44 is connected to the line 4 by line 45. The valve 46 is in the line 45 connecting the additional storage tank 44 to line 4. The valve 47 is in the line 4 between the storage tank 3 and the line 45 connecting line 4 with the additional storage tank 44. The selector switch 48 controls the valves 46 and 47 to proportion each fuel used or to select which fuel is used alone. Preferably the tank 44 contains gasoline.

Where methanol is the fuel in storage tank 3, the reaction $$CH_3OH \rightarrow CO + 2H_2 \qquad (II)$$

takes place in reactor 30. In the engine 15, CO and $H_2$ from line 36 are mixed with $O_2$, for example in a carburetor with an air intake opening, and combusted by reaction $$CO + H_2 + O_2 \rightarrow CO_2 + H_2O. \qquad (III)$$

While the invention has been described above with respect to certain of its preferred embodiments, it is respectfully pointed out that many variations and modifications are possible within the scope of the present invention and it is anticipated that many such variations and modifications may appear obvious or desirable to those skilled in the art based upon a review of the foregoing description of preferred embodiments.

What is claimed is:

1. A method of cold start-up for an engine fueled by alcohol or hydrogen dissociated from alcohol comprising the sequence of steps as follows:
   (a) providing a first vaporizer means, a second vaporizer means, a methanation catalyst within a first reactor means, and a dissociation catalyst within a second reactor means,
   (b) vaporizing alcohol in said first vaporizer means to form a first alcohol vapor,
   (c) contacting said first alcohol vapor and said methanation catalyst to form methane,
   (d) passing said methane to said engine,
   (e) starting said engine,
   (f) vaporizing alcohol in said second vaporizer means to form second alcohol vapor,
   (g) contacting said second alcohol vapor and said dissociation catalyst in said second catalytic reactor to form hydrogen and carbon monoxide,
   (h) conveying said hydrogen and carbon monoxide to said engine to sustain the operation of said engine.

2. The method of claim 1 wherein said alcohol is methanol or ethanol, and further comprising conveying atomized liquid alcohol to said engine.

3. The method of claim 1 wherein said methanation catalyst comprises nickel.

4. The method of claim 1 wherein said methanation catalyst comprises nickel and alumina.

5. The method of claim 1 wherein said methanation catalyst comprises nickel and silica.

6. A method of cold start-up for an engine fueled by alcohol or hydrogen dissociated from alcohol comprising the sequence of steps as follows:
   (a) providing a methanation catalyst in a reactor means,
   (b) passing alcohol over said methanation catalyst to form a fuel mixture comprising methane,
   (c) mixing said fuel mixture with air to form a combustion mixture,
   (d) igniting said combustion mixture in said internal combustion engine to start said engine,
   (e) passing atomized alcohol to said engine to sustain the operation of said engine.

7. The method of claim 6 further comprising
   (f) passing alcohol to a dissociation catalyst to form hydrogen and carbon monoxide,
   (g) passing said hydrogen and carbon monoxide to said engine.

8. The method of claim 6 wherein said fuel mixture further comprises atomized alcohol.

* * * * *